(12) United States Patent
Desvigne et al.

(10) Patent No.: US 11,192,644 B2
(45) Date of Patent: Dec. 7, 2021

(54) AIRCRAFT ROTOR BLADE SLEEVE HAVING A PROTUBERANCE IN ITS REAR ZONE, AND A ROTOR PROVIDED WITH SUCH A SLEEVE

(71) Applicant: AIRBUS HELICOPTERS, Marignane (FR)

(72) Inventors: Damien Desvigne, Aix en Provence (FR); David Alfano, Velaux (FR)

(73) Assignee: AIRBUS HELICOPTERS, Marignane (FR)

(*) Notice: Subject to any disclaimer, the term of this patent is extended or adjusted under 35 U.S.C. 154(b) by 781 days.

(21) Appl. No.: 16/067,188

(22) PCT Filed: Jun. 16, 2017

(86) PCT No.: PCT/FR2017/000120
§ 371 (c)(1),
(2) Date: Jun. 29, 2018

(87) PCT Pub. No.: WO2018/229349
PCT Pub. Date: Dec. 20, 2018

(65) Prior Publication Data
US 2021/0206482 A1 Jul. 8, 2021

(30) Foreign Application Priority Data
Jun. 16, 2017 (FR) .................................... 1770639

(51) Int. Cl.
*B64C 27/48* (2006.01)
*B64C 27/467* (2006.01)
*B64C 3/14* (2006.01)

(52) U.S. Cl.
CPC ............ *B64C 27/48* (2013.01); *B64C 27/467* (2013.01); *B64C 2003/148* (2013.01); *F05D 2240/30* (2013.01)

(58) Field of Classification Search
CPC .. B64C 27/48; B64C 27/467; B64C 2003/148
See application file for complete search history.

(56) References Cited

U.S. PATENT DOCUMENTS

| 4,432,696 A | 2/1984 | Stephan et al. |
| 5,860,626 A | 1/1999 | Moser |

(Continued)

FOREIGN PATENT DOCUMENTS

| DE | 3704552 C1 | 3/1988 |
| EP | 0048799 A1 | 4/1982 |

(Continued)

OTHER PUBLICATIONS

International Search Report for Application No. PCT/FR2017/000120, Completed by the European Patent Office, dated Mar. 7, 2018, 12 pages.

(Continued)

*Primary Examiner* — Juan G Flores
(74) *Attorney, Agent, or Firm* — Brooks Kushman P.C.

(57) ABSTRACT

A sleeve connecting a blade to the hub of a rotor of a rotary wing aircraft. The sleeve has a leading edge and a trailing edge, together with a protuberance arranged on the trailing edge. The dimensions of the protuberance are linked to the dimensions of the sleeve. The presence of the protuberance serves to improve the aerodynamic behavior of the sleeve and of the rotor during rotation of the rotor while the aircraft is moving forwards, both when the sleeve is advancing and when it is retreating. The presence of the protuberance also serves to reduce the vibration generated by a wake of the rotor on a tail boom or on a horizontal and/or vertical stabilizer of the aircraft.

20 Claims, 3 Drawing Sheets

(56) References Cited

U.S. PATENT DOCUMENTS

| | | | |
|---|---|---|---|
| 6,345,791 B1 | 2/2002 | McClure | |
| 8,444,382 B2 * | 5/2013 | Stamps | B64C 27/37 416/1 |
| 8,784,057 B2 * | 7/2014 | Podgurski | B64C 27/473 416/142 |
| 9,771,152 B2 * | 9/2017 | Thomas | B64C 27/48 |
| 2009/0074578 A1 | 3/2009 | Dewar et al. | |
| 2011/0206513 A1 * | 8/2011 | Walker | B64C 27/32 416/88 |
| 2012/0175461 A1 * | 7/2012 | van der Westhuizen | B64C 27/025 244/17.25 |

FOREIGN PATENT DOCUMENTS

| | | |
|---|---|---|
| EP | 0615903 A1 | 9/1994 |
| EP | 0724691 B1 | 6/1998 |
| EP | 1112928 A2 | 7/2001 |
| EP | 2657130 A1 | 10/2013 |
| EP | 2772431 A2 | 9/2014 |
| EP | 2778051 A1 | 9/2014 |
| EP | 2806156 A1 | 11/2014 |
| EP | 2772431 A3 | 12/2014 |

OTHER PUBLICATIONS

Website: http://www.cleantechrepublic.com/2009/03/06/des-pales-en-forme-de-nageoire-de-baleine-pour-doper-la-performance-dune-eolienne.
Website: http://peswiki.com/index.php/Directory:WhalePower_Corp.
Notice of Preliminary Rejection for Korean Application No. 10-2018-7017010, dated Jul. 8, 2019, 4 Pages.

* cited by examiner

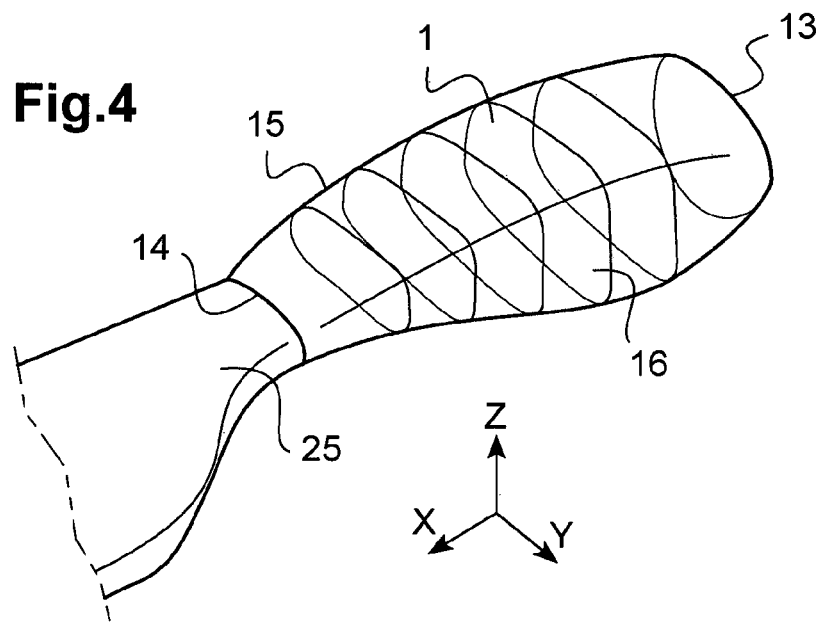
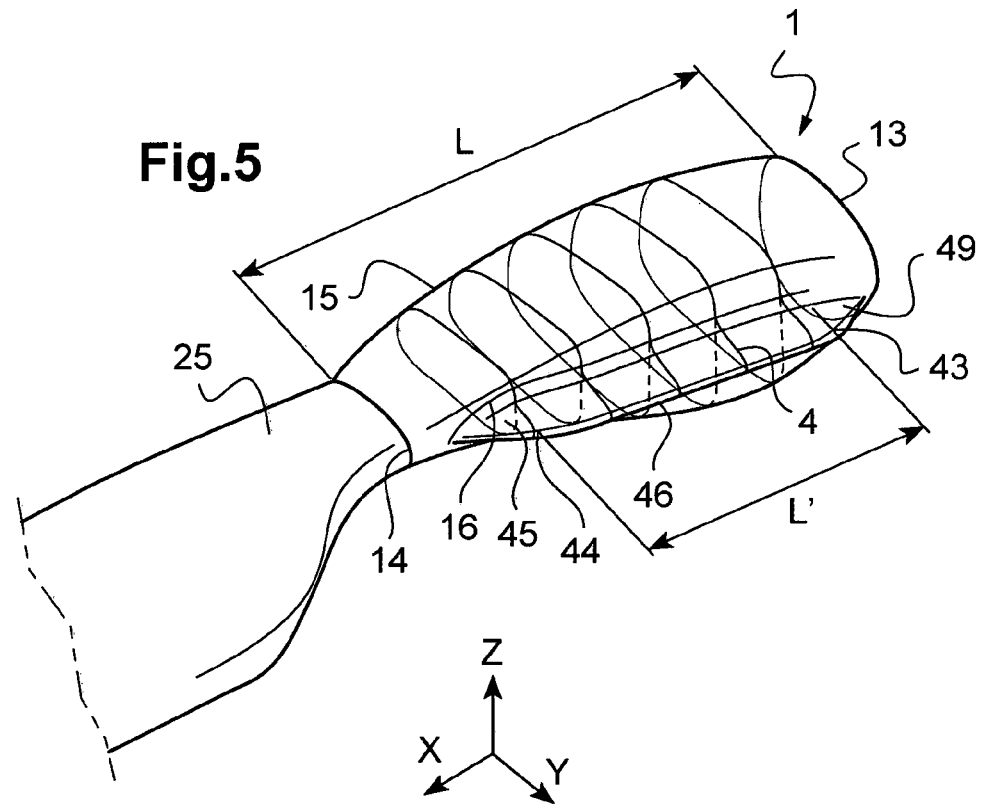

AIRCRAFT ROTOR BLADE SLEEVE HAVING A PROTUBERANCE IN ITS REAR ZONE, AND A ROTOR PROVIDED WITH SUCH A SLEEVE

CROSS-REFERENCE TO RELATED APPLICATIONS

This application is the U.S. national Phase of PCT Application No. PCT/FR2017/000120 filed Jun. 16, 2017, which claims priority to French Application No. FR 1770639 filed Jun. 16, 2017, the disclosures of which are incorporated in their entirety by reference.

BACKGROUND OF THE INVENTION

(1) Field of the Invention

The present invention relates to the field of aerodynamic surfaces, and more particularly of aerodynamic surfaces forming a rotary wing.

The present invention relates to a thick aerodynamic envelope, such as a sleeve for an aircraft rotor blade, the envelope being provided with a protuberance, and also to a rotor provided with such a thick aerodynamic envelope. The present invention also provides a rotary wing aircraft.

The project leading to this patent application has received from the European Union's Horizon funding 2020 research and innovation program, under CleanSky 2 grant agreement N° GAM-FRC-2014-001 Issue E.

(2) Description of Related Art

A rotary wing aircraft has a fuselage carrying a main rotor. The fuselage is extended longitudinally rearwards by a tail boom for carrying one or more stabilizers for providing the aircraft with aerodynamic stability, together with a yaw anti-torque auxiliary rotor.

Each rotor comprises a rotary hub and a plurality of blades. Each blade is connected to the hub and is driven in rotation by the hub. When in rotation, these blades describe a circle on a plane perpendicular to the axis of rotation of the hub, which circle is commonly referred to as the "rotor disk".

Conventionally, such a blade extends longitudinally spanwise from a first end that is generally referred to as the "blade root" that is for fastening to the hub, towards a second end that is free. As a result, the blade extends radially relative to the rotor from the first end towards the second end in a spanwise longitudinal direction of the blade. Furthermore, the blade extends transversely from a leading edge towards a trailing edge of each profile of the blade, following the chord of the profile in question.

A blade is connected to the hub by a structural junction device that may be faired, in particular in order to reduce its aerodynamic drag. Such a faired structural junction device is generally referred to as a "sleeve" or by the term "blade cuff". The term "blade cuff" is used more particularly for a rotor that is said to be "rigid".

A rotary wing aircraft presents the advantage of being capable of flying equally well at high speeds of advance during cruising flight and at very low speeds of advance, and also of being capable of hovering.

During rotation of the rotor while the aircraft is in forward flight, a blade is said to be an "advancing" blade while it is going from the rear of the aircraft towards the front of the aircraft. In contrast, a blade is said to be a "retreating" blade while it is moving from the front of the aircraft towards the rear of the aircraft.

During hovering flight or flight at very low speeds of advance, each blade, regardless of whether it is advancing or retreating, is swept by a substantially identical stream of air that is generated mainly by the rotation of the rotor, and consequently by the rotation of the blade. This stream of air causes aerodynamic forces to appear, in particular a lift aerodynamic force that serves to keep the aircraft in the air.

During forward flight at faster speeds of advance, each blade is swept by two streams of air. A first stream of air is generated by the rotation of the rotor, and a second stream of air is generated by the forward speed of the aircraft. For an advancing blade, these two streams of air add together, whereas for a retreating blade, these two streams of air are in opposition. These two streams of air give rise to the appearance of aerodynamic forces, in particular an aerodynamic lift force, that enable the aircraft to be kept in the air, and also that serve to propel it, together with an aerodynamic drag force that tends to oppose the advance of the aircraft.

Furthermore, a rotor passing through the second stream of air generated by the advance of the aircraft causes a wake to appear behind the rotor. The wake may present unsteadinesses of large amplitude together with a harmonic type frequency signature of broadband type, or indeed a superposition of both. These unsteadinesses are due in particular to the shape of elements constituting the central portion of the rotor, namely the sleeves and the hubs, to their aerodynamic interactions with two streams of air, and also to the rotation of the blades and of the sleeves together with their orientations relative to the stream of air that vary during such rotation, in particular in a specific zone of the rotor disk referred to by the person skilled in the art as the "inversion circle".

These unsteadinesses, as a result of their impacts on elements of the aircraft situated behind the main rotor, and in particular on the tail boom and on the horizontal or vertical stabilizers of the aircraft, have the particular consequence of reducing the flying qualities of the aircraft, since the elements situated behind the main rotor are fed with air that is greatly disturbed, and also of vibration appearing in those elements, which phenomenon is known as "tail shake". Such vibration is then transmitted to the cabin of the aircraft by the structure of the aircraft, leading to discomfort for the crew and possibly also damaging onboard equipment.

The inversion circle is the zone in which the local speed of the first stream of air due to the rotation of the blade is less than the speed in translation of the second stream of air due to the aircraft advancing. This inversion circle is situated in the azimuth circle corresponding to a retreating blade, in the proximity of the hub of the rotor. The inversion circle generally has an impact on the sleeve, on the blade root, and also on a portion of greater or lesser length of the streamlined portion of the blade, as a function of the advance ratio, where the advance ratio is defined as being the ratio of the speed of advance of the aircraft divided by the speed component at the tip of the blade due solely to the rotation of the rotor: the greater the advance ratio, the greater the inversion circle in terms of span and azimuth.

Under such circumstances, during their combined movements in rotation about the hub and in translation associated with the aircraft advancing, elements of the rotor that are included in the inversion circle are subjected to an incident airflow impacting them via their trailing edges in the inversion circle. Consequently, the shape of said rotor elements that are included in the inversion circle is generally not adapted to this reverse incident airflow, and as a result their aerodynamic behavior is degraded. In particular, the stream of air separates from those elements, and a rotor wake is being produced, including the unsteadinesses that characterize such a wake.

This phenomenon is amplified for hybrid helicopters having one or more propulsive propellers that enable helicopters to have high speeds of advance. Specifically, at high speeds of advance, the speed of rotation of the rotor may be reduced. Under such circumstances, the reverse incident airflow impacts at greater speed against the trailing edges of those rotor elements that are included in the inversion circle.

Outside the inversion circle, the incident airflow conventionally impacts the elements of the rotor via their leading edges, thereby giving rise to the expected aerodynamic behavior of those elements.

The streamlined portion of the blade is generally formed by an aerodynamic envelope that is said to be "thin", i.e. having relative thickness, which is equal to the ratio of the thickness of the envelope divided by its chord, that is small, e.g. less than or equal to 12%. The sleeve is generally formed by a so-called "thick" aerodynamic envelope, i.e. having relative thickness that is greater, e.g. lying in the range 25% to 150%. The blade root generally constitutes a transition zone between such a thin aerodynamic envelope and such a thick aerodynamic envelope, and as a result it may itself be formed at least in part by a thick aerodynamic envelope.

In particular, a sleeve may have a thick pseudo-elliptical shape, e.g. with relative thickness lying in the range 40% to 100%, firstly so as to enable the structural junction device between the blade root and the rotor hub to be faired, and secondly so as to adapt as well as possible to the specific features of the flows of the air streams that it is likely to encounter in the inversion circle during forward flight, namely an air stream going from the leading edge towards the trailing edge over an "advancing" sleeve, and a reverse stream of air directed from the trailing edge towards the leading edge over a "retreating" sleeve.

Such a thick pseudo-elliptical shape does not have a main purpose of generating an aerodynamic lift force, but rather one of limiting the aerodynamic drag generated by a structural junction device, which aerodynamic drag might typically be divided by two. Nevertheless, such thick pseudo-elliptical shapes present drawbacks, such as the appearance of major separations in the stream of air and of unsteadinesses in the wake generated by the rotor. Furthermore, even though aerodynamic drag is indeed reduced in comparison with a structural junction device that is not faired, it nevertheless remains significant, e.g. representing up to 10% of the total aerodynamic drag generated by a rotary wing aircraft.

The prior art has various solutions for improving the aerodynamic behavior of a lift generating aerodynamic surface swept by a stream of air, whether that surface is a blade or a wing.

By way of example, Document EP 0 724 691 and U.S. Pat. No. 6,345,791 describe aerodynamic surfaces having shapes in relief for the purpose of improving the aerodynamic characteristics of the surface and enhancing the flow of air over the surface.

In particular, Document EP 0 724 691 describes a blade having waves distributed along the span of the blade on its suction-side and pressure-side skins, going from the leading edge of the blade towards the trailing edge. Those waves serve to reduce the noise caused by the air sweeping over the blade and/or the aerodynamic drag generated by the blade.

Document U.S. Pat. No. 6,345,791 describes an aerodynamic surface, such as a wing, having riblets of small amplitude arranged parallel to the stream of air sweeping over the aerodynamic surface in order to reduce the aerodynamic drag generated by the aerodynamic surface.

Also known is Document US 2009/074578, which describes blades having tubercules on their leading edges, over all or part of the span of the blades. Those blades are derived from the fins of humpback whales which also include tubercules. The presence of such tubercules serves to improve the stability of the blades and to reduce the appearance of noise and also to reach large stall angles of about 30 degrees (30°). According to a test carried out by the Canadian wind energy association, the presence of such tubercules also serves to reduce the aerodynamic drag of blades and to increase their lift, e.g. leading to an increase in energy production of the order of 20% for a wind turbine having such blades, as set out at the following Internet address: http://www.cleantechrepublic.com/2009/03/06/des-pales-en-forme-de-n ageoire-de-baleine-pour-doper-la-performance-dune-eolienne. Such tubercules can also be provided on a wing and/or an airplane propeller, on a ship propeller, or indeed on a blade of an aircraft rotor, as set out at the following Internet address: http://peswiki.com/index.php/Directory:WhalePower_Corp.

In addition, Documents EP 0 615 903 and EP 1 112 928 describe aerodynamic surfaces including a flow deflector device arranged at the trailing edge of the aerodynamic surface so as to modify the shape of the trailing edge.

In particular, according to Document EP 0 615 903, the flow deflector device is arranged on the pressure-side skin of the blade and serves in particular to deflect the boundary layer of the flow. As a result, the flow deflector device serves to limit dynamic stalling of the aerodynamic surface subjected to a large angle of incidence. However, that flow deflector device has no influence on its aerodynamic behavior at small angles of incidence.

Finally known is Document EP 2 806 156, which describes a wind turbine blade having an aerodynamic appendix arranged at the trailing edge in order to reduce the noise generated by the blade. The aerodynamic appendix includes in particular two concave surfaces connected respectively to the pressure-side skin and to the suction-side skin of the blade and meeting so as to form a sharp edge.

Those various solutions apply to a fixed wing or else to a rotary blade, but under all circumstances, those solutions are described solely in the context of an application to thin aerodynamic surfaces. All of those solutions seek to improve specifically the aerodynamic characteristics and/or, where appropriate, to reduce the noise generated by going round or against the aerodynamic disturbances generated at the leading edge or at the trailing edge.

Nevertheless, those solutions also apply to a stream of air sweeping over an aerodynamic surface from its leading edge to its trailing edge. None of those solutions seeks to enhance the penetration of an aerodynamic surface into a reverse stream of air sweeping over that aerodynamic surface from its trailing edge towards its leading edge.

On the contrary, in such a reverse stream of air, those solutions can represent a brake to penetration of the aerodynamic surface into the air, e.g. for a blade provided with leading edge tubercules, or indeed an aerodynamic appendix arranged at the trailing edge, thereby increasing the aerodynamic drag of the aerodynamic surface.

Furthermore, with a rotary blade, no solution is applied in the central portion of the rotor, i.e. in the inversion circle, e.g. at a sleeve.

BRIEF SUMMARY OF THE INVENTION

An object of the present invention is to overcome the above-mentioned limitations and to limit the aerodynamic degradation generated by a rotor of an aircraft during forward flight, in particular by reducing the aerodynamic drag of the rotor and by limiting the production of a wake.

The invention relates to a thick aerodynamic envelope for connecting a blade to a hub of a rotor and serving to reduce separation of the stream of air, to reduce aerodynamic drag, and to reduce the production of a wake, both on the advancing side and on the retreating side of the thick aerodynamic envelope.

The invention also relates to a rotor for an aircraft, and a rotary wing aircraft.

The present invention thus provides a thick aerodynamic envelope for connecting to a rotary hub of an aircraft, the thick aerodynamic envelope extending firstly spanwise in a longitudinal direction X from a first end zone towards a second end zone, and secondly in a transverse direction Y between two transverse edges, the two transverse edges being a leading edge and a trailing edge, the thick aerodynamic envelope having a first suction-side surface and a first pressure-side surface.

The transverse direction Y is preferably perpendicular to the longitudinal direction X. An elevation direction Z is defined perpendicularly to the longitudinal and transverse directions X and Y in order to form a right-handed rectangular reference frame (X,Y,Z). A transverse plane Pyz perpendicular to the longitudinal direction X is also defined by the transverse and elevation directions Y and Z.

The thick aerodynamic envelope is formed by a succession of first profiles situated in planes parallel to the transverse plane Pyz. Each first profile is dimensionally defined in particular by a thickness h equal to a maximum distance between the first suction-side surface and the first pressure-side surface.

The thick aerodynamic envelope is also defined by a first length L equal to a distance between the first end zone and the second end zone along the longitudinal direction X.

The thick aerodynamic envelope of the invention is remarkable in that it includes at least one protuberance arranged on at least one of the transverse edges of the thick aerodynamic envelope, each protuberance being secured to the thick aerodynamic envelope, each protuberance having a second suction-side surface and a second pressure-side surface, each protuberance extending transversely from the transverse edge on which the protuberance is arranged to a transverse end of the protuberance where the second suction-side surface and the second pressure-side surface meet, each protuberance being configured to improve the aerodynamic behavior of the thick aerodynamic envelope when the thick aerodynamic envelope impacts a stream of air either with the leading edge or with the trailing edge. Each protuberance is formed by a succession of second profiles situated in planes parallel to the transverse plane Pyz, each second profile being dimensionally defined by:

a height h' equal to a distance between the second suction-side surface and the second pressure-side surface, the height h' lying in the range 0.2 to 0.6 times the thickness h of the thick aerodynamic envelope;

a width $\ell'$ equal to a distance between the first profile and the transverse end of the protuberance in the transverse direction Y, the width $\ell'$ lying in the range 0.5 to 2 times the height h' of the protuberance;

non-zero connection radii between the first profile of the thick aerodynamic envelope and the second profile of the protuberance; and a radius of curvature of the transverse end of the protuberance between the second suction-side surface and the second pressure-side surface that is greater than a minimum radius $R_{mini}$.

The protuberance is also defined by a second length L' equal to a distance between a third end zone and a fourth end zone of the protuberance along the longitudinal direction X, the second length L' lying in the range 0.5 to 1 times the first length L of the thick aerodynamic envelope.

The thick aerodynamic envelope of the invention is intended particularly to connect a blade to a rotary hub of an aircraft. The rotary hub together with each thick aerodynamic envelope connected to the hub and with each blade connected to the thick aerodynamic envelope thus constitutes a rotor of an aircraft. The rotor may be a main rotor providing a rotary wing aircraft with lift and possibly also propulsion. The rotor may also be an anti-torque auxiliary rotor of a rotary wing aircraft. The rotor may also be a propulsion rotor fitted to an aircraft.

The thick aerodynamic envelope of the invention may for example constitute an aerodynamic fairing for a structural junction device connecting such a blade to a rotary hub of an aircraft. The thick aerodynamic envelope of the invention may also be such a faired structural junction device. The thick aerodynamic envelope of the invention may for example be a sleeve or a blade cuff of an aircraft rotor.

The thick aerodynamic envelope of the invention may also be a blade root connected by a structural junction device to the rotary hub of an aircraft.

The thickness h of a first profile of the thick aerodynamic envelope and the height h' of a second profile of the protuberance are preferably defined in the elevation direction Z.

Each first profile of the thick aerodynamic envelope is also dimensionally defined by:

a chord $\ell$ equal to a maximum distance between the leading edge and the trailing edge; and a relative thickness equal to the ratio of the thickness h divided by the chord $\ell$.

In the context of the invention, the relative thickness of the thick aerodynamic envelope preferably lies in the range 40% to 100%.

Among thick aerodynamic envelopes, it is possible to distinguish between so-called "short" thick aerodynamic envelopes and so-called "long" thick aerodynamic envelopes where "short" and "long" are considered along the spanwise longitudinal direction X. For example, a thick aerodynamic envelope is considered to be short for a first length L less than or equal to 150% of the chord $\ell$, and long for a first length L greater than 150% of the chord $\ell$.

Preferably, for a short thick aerodynamic envelope, the second length L' of the protuberance is equal to the first length L of the thick aerodynamic envelope so that the protuberance has a second length L' that is sufficient to act significantly on the stream of air sweeping over the thick aerodynamic envelope.

For a long thick aerodynamic envelope, the second length L' of the protuberance preferably lies in the range 0.7 to 1 times the first length L of the thick aerodynamic envelope.

When the second length L' is strictly less than the first length L, the connection between the transverse end of the protuberance and the first suction- and pressure-side surfaces of the thick aerodynamic envelope is preferably a progressive connection, e.g. having a slope and connection radii that are not zero.

Furthermore, the width $\ell'$ of the protuberance may vary in application of a spanwise variation relationship. For each plane parallel to the transverse plane Pyz, the width $\ell'$ then varies as a function of its span position along the longitudinal direction X. Likewise, the height h' may also vary in application of a spanwise variation relationship. Such variations in the width $\ell'$ and/or the height h' of the protuberance enable the shape of the protuberance to be adapted as well as possible to the local speed of the flow of air over the thick aerodynamic envelope. Such variations in the width $\ell'$ and/or the height h' are preferably applicable for long thick aerodynamic envelopes.

A protuberance is preferably arranged on the trailing edge of the thick aerodynamic envelope. The presence of the protuberance serves to refine the thick trailing edge of the thick aerodynamic envelope, and advantageously, for a thick aerodynamic envelope that is advancing in its rotation, to reduce separations of the stream of air. As a result, the presence of the protuberance makes it possible to reduce aerodynamic drag and to reduce the producing of a wake and also to limit both the amplitude of the unsteadinesses contained in the wake and also the frequency signature of the wake.

The presence of this protuberance also makes it possible, in non-intuitive manner, to improve the aerodynamic behavior of the thick aerodynamic envelope while it is retreating in its rotation. Specifically, the protuberance then impacts first against the stream of air and serves to improve penetration of the thick aerodynamic envelope into the stream of air compared with a thick aerodynamic envelope that is not provided with the protuberance. Consequently, the protuberance makes it possible to limit separation of the stream of air from the thick aerodynamic envelope, and as a result to reduce the aerodynamic drag and the production of a wake, and also to reduce both the amplitude of the unsteadinesses contained in the wake and also the frequency signature of the wake.

By way of example, the reduction in aerodynamic drag may be about 10% compared with a thick aerodynamic envelope that is not provided with a protuberance. Furthermore, the size of the vortices generated by a thick aerodynamic envelope is significantly reduced, e.g. by about 20% for an advancing thick aerodynamic envelope and by about 50% for a retreating thick aerodynamic envelope. Even greater improvements in the production of a wake are obtained on the "retreating" sector of the rotor.

Nevertheless, a protuberance may also be arranged solely on the leading edge of the thick aerodynamic envelope. Once more, it is the protuberance that is the first to impact the stream of air when the thick aerodynamic envelope is advancing, thereby improving penetration of the thick aerodynamic envelope into the stream of air and consequently limiting separation of the stream of air from the thick aerodynamic envelope and consequently reducing the aerodynamic drag and the production of a wake. For a retreating thick aerodynamic envelope, the presence of the protuberance also serves to reduce both aerodynamic drag and also the production of a wake. In both situations, the protuberance serves to reduce the amplitude of the unsteadinesses contained in the wake and to reduce the frequency signature of the wake.

It may be observed that the thicker the thick aerodynamic envelope is, the more the presence of a protuberance on the leading edge has positive effects both on reducing aerodynamic drag and also the production of a wake. Specifically, the leading edge tends to become very "straight" for a very thick aerodynamic envelope.

Likewise, a first protuberance may be arranged on the trailing edge of the thick aerodynamic envelope and a second protuberance may also be arranged on the leading edge of the thick aerodynamic envelope. The stream of air is then always impacted first by a protuberance, regardless of whether the thick aerodynamic envelope is advancing or retreating, and separation of the stream of air from the thick aerodynamic envelope is limited. Consequently, both aerodynamic drag and also the production of a wake are reduced, as are the amplitude of the unsteadinesses contained in the wake and the frequency signature of the wake.

Furthermore, a plurality of protuberances may be arranged on the same transverse edge of the thick aerodynamic envelope, in particular for a thick aerodynamic envelope that is long.

The thick aerodynamic envelope and each protuberance may form a single part such that the first suction- and pressure-side surfaces and the second suction- and pressure-side surfaces form a single envelope.

Each protuberance may also be an element added to the thick aerodynamic envelope. Each protuberance may for example be adhesively bonded to the thick aerodynamic envelope. Each protuberance may equally well be attached to the thick aerodynamic envelope by screws and/or rivets. Any other means for fastening each protuberance on the thick aerodynamic envelope that enables a rigid connection to be made between the thick aerodynamic envelope and each protuberance could equally well be used.

Either way, the thick aerodynamic envelope and the protuberance are preferably made of composite materials.

Furthermore, there is preferably no air passage between the thick aerodynamic envelope and the protuberance. As a result, the second suction-side surface is connected to the first suction-side surface and the second pressure-side surface is connected to the first pressure-side surface in continuous manner. Consequently, the stream of air sweeping over the thick aerodynamic envelope flows continuously over each first suction- and pressure-side surface of the thick aerodynamic envelope and over each second suction- and pressure-side surface of each protuberance, advantageously limiting the appearance of turbulence in the air stream, and consequently reducing both aerodynamic drag and also the production of a wake.

Likewise, in order to enable a flow that is continuous, while minimizing turbulence in the stream of air sweeping over each first suction- and pressure-side surface and each second suction- and pressure-side surface, connection radii are arranged between each first profile of the thick aerodynamic envelope and each second profile of each protuberance. Preferably, these connection radii are greater than or equal to 25% of the height h' of the protuberance. These connection radii are also preferably defined so that tangential continuity is ensured between each second profile of the protuberance and each first profile of the thick aerodynamic envelope.

The transverse edge on which the protuberance is arranged also has connection radii respectively with the first suction-side surface and with the first pressure-side surface of the thick aerodynamic envelope.

Furthermore, at the transverse end of each protuberance, the minimum radius $R_{mini}$ connecting the second suction-side surface with the second pressure-side surface of the protuberance is preferably greater than or equal to 15% of the height h' of the protuberance. The minimum radius $R_{mini}$ is preferably less that the connection radii between each first profile and each second profile, such that the protuberance is defined with a base that is relatively wide and a transverse end that is narrower.

The protuberance is preferably of a shape that tapers from the first suction- and pressure-side surfaces towards the transverse end of the protuberance in order to reduce the separation of the air stream and reduce aerodynamic drag for a thick aerodynamic envelope that is retreating and so as to reduce the production of a wake for a thick aerodynamic envelope that is advancing. Consequently, the height h' of the protuberance lies between two junction points, a first junction point being defined between the first suction-side surface and the second suction-side surface, and a second junction point being defined between the first pressure-side surface and the second pressure-side surface.

Furthermore, the second suction-side surface and the second pressure-side surface do not have any tangential discontinuity. Under such circumstances, each second profile is continuous and its slope varies continuously. As a result, the second suction-side surface and the second pressure-side surface of each protuberance generally include a point of inflection between the first suction- and pressure-side surfaces and the transverse end.

Furthermore, a protuberance may be oriented in various ways relative to the transverse edge on which it is arranged and/or relative to the transverse direction Y.

For example, the protuberance is arranged substantially perpendicularly to the transverse edge on which the protuberance is arranged. As a result, in each plane parallel to the transverse plane Pyz, each second profile of the protuberance is arranged perpendicularly to a straight line connecting together the two junction points firstly between the first and second suction-side surfaces and secondly between the first and second pressure-side surfaces.

In another example, the protuberance slopes relative to a direction that is substantially perpendicular to the transverse edge on which the protuberance is arranged. As a result, in each plane parallel to the transverse plane Pyz, each second profile is arranged so that it is not perpendicular to a straight line connecting together those two junction points.

Furthermore, each protuberance may include a plane of symmetry. Specifically, in each plane parallel to the transverse plane Pyz, each second profile of each protuberance includes an axis of symmetry. This axis of symmetry may for example be the transverse direction Y in the special circumstance of the protuberance being arranged perpendicularly to the transverse edge, the transverse edge itself being perpendicular to the transverse direction Y.

The present invention also provides an aircraft rotor, the rotor having a hub, at least two blades, and thick aerodynamic envelopes as described above. Each thick aerodynamic envelope connects a respective blade to the hub. Each protuberance is then configured so as to reduce the aerodynamic drag and reduce the production of a wake of the rotor, and also so as to limit the amplitude of the unsteadinesses characterizing the wake and so as to reduce its frequency signature.

Consequently, the aerodynamic interactions between the wake and elements situated behind the rotor, such as the tail boom, the auxiliary rotor, and the horizontal or vertical stabilizers, are reduced, contributing to improving their aerodynamic efficiency and more generally to improving the flying qualities of the aircraft.

The rotor may be a main rotor or it may be an anti-torque auxiliary rotor of a rotary wing aircraft. The rotor may also be a propulsion rotor fitted to an aircraft.

The present invention also provides a rotary wing aircraft comprising a fuselage, a tail boom, optionally at least one horizontal and/or vertical stabilizer, and at least one rotor as defined above. Each protuberance is configured firstly so as to reduce both the production of a wake from the rotor and also the unsteadinesses characterizing the wake, and secondly so as to limit both frequency excitation and also the appearance of vibration in elements of the aircraft that are situated behind the rotor, and in particular in the tail boom.

BRIEF DESCRIPTION OF THE DRAWINGS

The invention and its advantages appear in greater detail from the context of the following description of embodiments given by way of illustration and with reference to the accompanying figures, in which:

FIG. 4 is a perspective view of a prior art sleeve;
FIG. 5 is a perspective view of a thick aerodynamic envelope of the invention.

DETAILED DESCRIPTION OF THE INVENTION

Elements present in more than one of the figures are given the same references in each of them.

Figure 1:
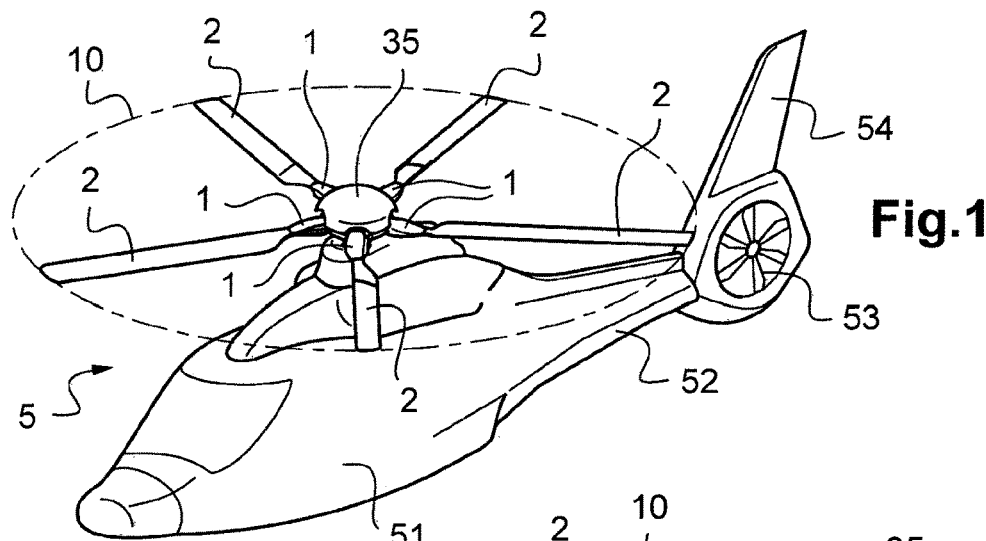
FIG. 1 shows an aircraft having a rotor.

FIG. 1 shows a rotary wing aircraft 5 having a fuselage 51, a main rotor 10, and a tail boom 52 supporting a yaw anti-torque auxiliary rotor 53 and a vertical stabilizer 54. The rotor 10 has a hub 3, five blades 2, and five sleeves 1, together with a cover 35 and inter-blade dampers 32. The cover 35 serves to protect and to fair the head of the rotor 10.

Figure 2:
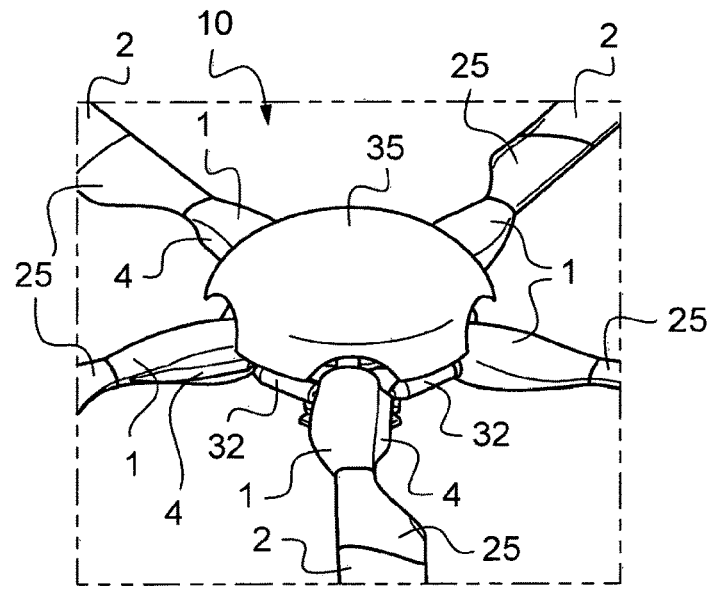
FIGS. 2 and 3 are fragmentary views of a rotor.
Figure 3:
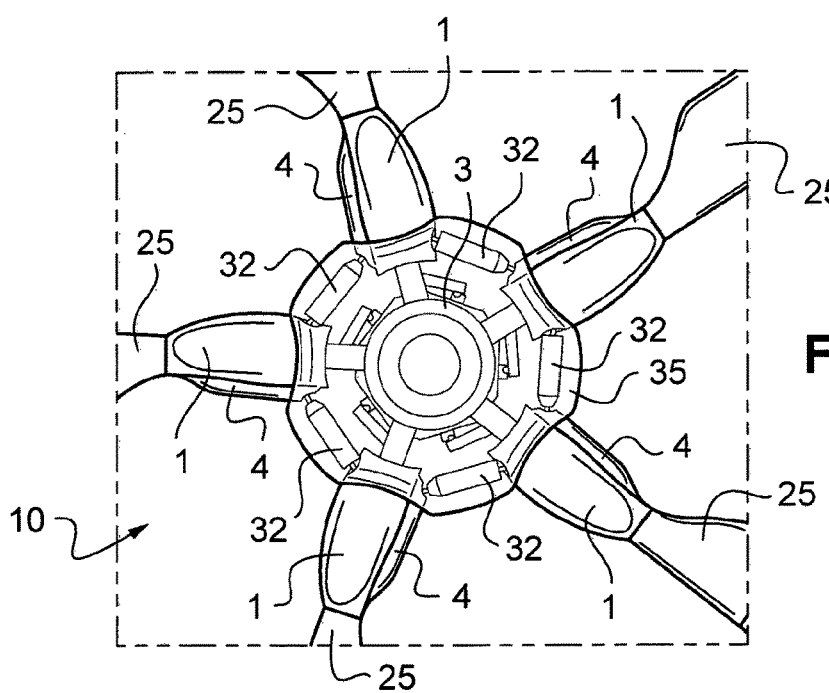

FIGS. 2 and 3 show the central portion of the rotor 10, the free end of each blade 2 being truncated. Only the root 25 of each blade 2 can be seen in the figures. In FIG. 3, the cover 35 is shown transparently so as to reveal the hub 3 and the dampers 32.

Each blade 2 serves to generate an aerodynamic lift force during rotation of the rotor 10 in order to provide the aircraft 5 with lift and with propulsion. Each sleeve 1 is a thick aerodynamic envelope providing aerodynamic fairing for a structural junction device (not shown) connecting the blade 2, and more precisely the blade root 25, to the hub 3 of the rotor 10.

A thick aerodynamic envelope 1 fitted with a protuberance 4 of the invention is shown in perspective in FIG. 5 together with the module root 25, while FIG. 4 shows a prior art thick aerodynamic envelope 1 providing a blade root with aerodynamic fairing.

Each blade 2 and each thick aerodynamic envelope 1 extends spanwise in a longitudinal direction X. A transverse direction Y is perpendicular to the longitudinal direction X, and an elevation direction Z is defined perpendicularly to the longitudinal and transverse directions X and Y so as to form a right-hand rectangular reference frame (X,Y,Z). A transverse plane Pyz perpendicular to the longitudinal direction X is also defined by the transverse and elevation directions Y and Z.

Figure 6:
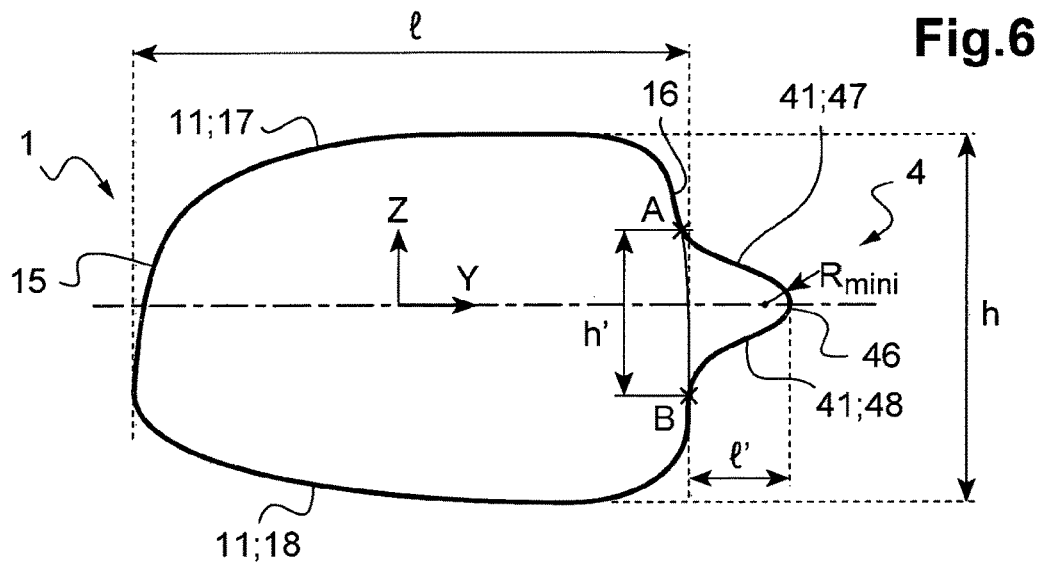
FIGS. 6 to 8 are transverse views of thick aerodynamic envelopes.
Figure 7:
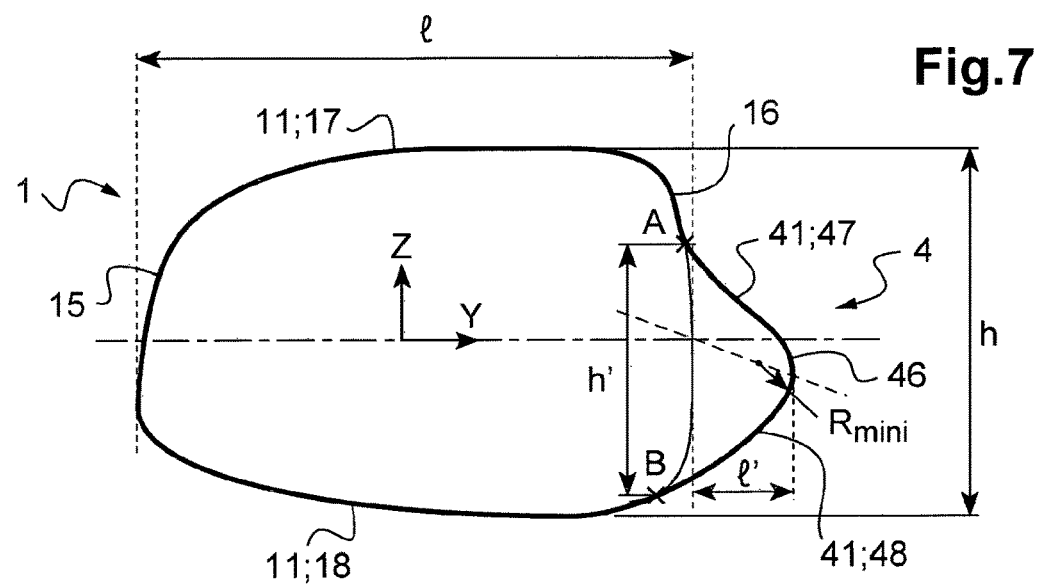
Figure 8:
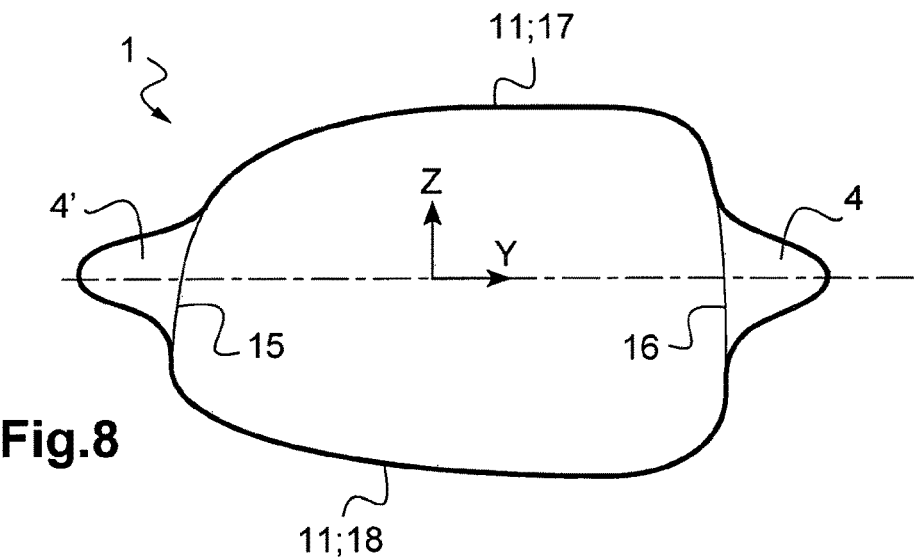

FIGS. 6 to 8 are cross-sections parallel to the transverse plane Pyz in embodiments of thick aerodynamic envelopes 1 provided with one or two protuberances 4.

The thick aerodynamic envelope 1 extends firstly spanwise in the longitudinal direction X from a first end zone 13 situated beside the hub 3 towards a second end zone 14 situated beside the blade root 25, and secondly in the transverse direction Y between a leading edge 15 and a trailing edge 16. The thick aerodynamic envelope 1 has a first suction-side surface 17 and a first pressure-side surface 18.

A first profile 11 of the thick aerodynamic envelope 1 is defined in each plane parallel to the transverse plane Pyz by:

a chord $\ell$ equal to a maximum distance between the leading edge 15 and the trailing edge 16;

a thickness h equal to a maximum distance between the first suction-side surface 17 and the first pressure-side surface 18 in the elevation direction Z; and a relative thickness equal to the ratio of the thickness h divided by the chord $\ell$, and lying for example in the range 40% to 100%.

The thick aerodynamic envelope 1 is also defined by a first length L equal to a distance between the first end zone 13 and the second end zone 14 in the spanwise longitudinal direction X.

The thick aerodynamic envelope 1 of the invention includes at least one protuberance 4 that is visible in FIGS. 2, 3, and 5 to 8. Each protuberance 4 has a second suction-side surface 47 and a second pressure-side surface 48, the second suction- and pressure-side surfaces 47 and 48 meeting at a transverse end 46 of the protuberance 4. Each protuberance 4 extends firstly longitudinally along the longitudinal direction X from a third end zone 43 situated beside the hub 3 to a fourth end zone 44 situated beside the blade root 25, and secondly transversely in the transverse direction Y from the transverse edge 15, 16 on which the protuberance 4 is arranged towards the transverse end 46.

The first suction- and pressure-side surfaces 17 and 18 of the thick aerodynamic envelope 1 and the second suction- and pressure-side surfaces 47 and 48 of each protuberance 4 form a single envelope.

A second profile 41 of each protuberance 4 is defined in each plane parallel to the transverse plane Pyz by:

a height h' equal to a distance between the second suction- and pressure-side surfaces 47 and 48 in the elevation direction Z, the height h' lying in the range 0.2 to 0.6 times the thickness h of the thick aerodynamic envelope 1;

a width $\ell'$ equal to a distance between the transverse edge 15, 16 on which the protuberance 4 is arranged and the transverse end 46 of the protuberance 4 in the transverse direction Y, the width $\ell'$ lying in the range 0.5 to 2 times the height h' of the protuberance 4;

non-zero connection radii, e.g. radii greater than or equal to 25% of the height h' of the protuberance 4, firstly between the first suction-side surface 17 and the second suction-side surface 47, and secondly between the first pressure-side surface 18 and the second pressure-side surface 48; and a radius of curvature of the transverse end 46 between the second suction-side surface 47 and the second pressure-side surface 48 that is greater than a minimum radius $R_{mini}$, which by way of example is greater than or equal to 15% of the height h' of the protuberance 4.

By way of example, and as shown in FIGS. 6 and 8, the protuberance 4 has a second profile 41 of Gaussian shape with a broad base and a narrow transverse end 46.

The protuberance 4 is also defined by a second length L' equal to a distance between the third end zone 43 and the fourth end zone 44 in the longitudinal direction X, the second length L' lying in the range 0.5 to 1 times the first length L of the thick aerodynamic envelope 1.

The presence of this protuberance 4 serves advantageously to improve the aerodynamic behavior of the thick aerodynamic envelope 1 during rotation of the rotor 10, for a thick aerodynamic envelope 1 both when it is advancing and when it is retreating, firstly by reducing the aerodynamic drag and the production of a wake, and secondly by limiting the amplitude of the unsteadinesses contained in the wake and limiting the amplitude of the frequency signature of the wake.

The protuberance 4 is of a shape that tapers from the transverse edge 15, 16 on which the protuberance 4 is arranged and going towards the transverse end 46. As a result, the height h', which is a maximum distance between the second suction-side surface 47 and the second pressure-side surface 48 in the elevation direction Z, is defined by two junction points A, B: the first junction point A being the point of intersection between the first suction-side surface 17 and the second suction-side surface 47; and the second junction point B being the point of intersection between the first pressure-side surface 18 and the second pressure-side surface 48, as shown in FIGS. 6 and 7.

Furthermore, the second suction-side surface 47 and the second pressure-side surface 48 have a point of inflection between each junction point A, B and the transverse end 46 so as to enable the stream of air to flow continuously and without encountering any sharp edge. As a result, the thick aerodynamic envelope 1 of the invention also limits the appearance of turbulence in the air stream sweeping over it.

In FIGS. 5 to 7, the protuberance 4 is arranged on the trailing edge 17 of the thick aerodynamic envelope 1. In FIG. 8, two protuberances 4 and 4' are arranged on the thick aerodynamic envelope 1, a first protuberance 4 being arranged on the trailing edge 16, and a second protuberance 4' being arranged on the leading edge 15. Nevertheless, a protuberance 4 may be arranged on the leading edge 17 only of a thick aerodynamic envelope 1.

The thick aerodynamic envelope 1 shown in the figures is a long thick aerodynamic envelope, however a protuberance 4 may also be arranged on the leading edge 15 and/or the trailing edge 16 of a short thick aerodynamic envelope 1.

In FIGS. 2, 3, and 5, it can be seen that the second length L' of the protuberance 4 is strictly less than the first length L of the thick aerodynamic envelope 1. Under such circumstances, in order to enable a progressive connection to be made between the transverse end 46 of the protuberance 4 and each of the first suction- and pressure-side surfaces 17 and 18, the thick aerodynamic envelope 1 has two connection zones 45 and 49 arranged respectively going from the third and fourth end zones 43 and 44 towards respectively the first end zone 13 and the second end zone 14. Each connection zone 45, 49 has non-zero connection radii and a slope for connecting the transverse end 46 progressively to the first suction- and pressure-side surfaces 17 and 18 at the third end zone 43 beside the hub 3 and at the fourth end zone 44 beside the blade root 25.

Furthermore, in FIGS. 6 and 8, each protuberance 4 is symmetrical relative to the transverse direction Y, the protuberance 4 being arranged substantially perpendicularly to the trailing edge 16; and in the example of FIG. 8, the protuberance 4' is arranged substantially perpendicularly to the leading edge 15.

In FIG. 7, the protuberance 4 slopes relative to the transverse direction Y and is arranged in a manner that is not perpendicular to the trailing edge 16. This protuberance 4 thus does not have an axis of symmetry.

Naturally, the present invention may be subjected to numerous variations as to its implementation. Although several embodiments are described, it will readily be understood that it is not conceivable to identify exhaustively all possible embodiments.

For example, a thick aerodynamic envelope 1 having one or more protuberances 4 may be arranged on an anti-torque auxiliary rotor of a rotary wing aircraft, or indeed on a propulsive rotor of an aircraft.

It is naturally possible to envisage replacing any of the means described by equivalent means without going beyond the ambit of the present invention.

The invention claimed is:

1. A thick aerodynamic envelope for connecting to a rotary hub of an aircraft, the thick aerodynamic envelope extending firstly spanwise in a longitudinal direction from a first end zone to a second end zone, and secondly in a transverse direction between two transverse edges, the two transverse edges being a leading edge and a trailing edge, the thick aerodynamic envelope having a first suction-side surface and a first pressure-side surface, the thick aerodynamic envelope being defined by a first length L equal to a distance between the first end zone and the second end zone along the longitudinal direction;
   the thick aerodynamic envelope being formed by a succession of first profiles situated in planes parallel to a transverse plane perpendicular to the longitudinal direction, each first profile being defined in a plane parallel to the transverse plane by a thickness h equal to a maximum distance between the first suction-side surface and the first pressure-side surface;
   wherein the thick aerodynamic envelope includes at least one protuberance arranged on at least one of the transverse edges, the at least one protuberance being secured to the thick aerodynamic envelope, the at least one protuberance having a second suction-side surface and a second pressure-side surface, the at least one protuberance extending transversely from the transverse edge on which the at least one protuberance is arranged to a transverse end of the at least one protuberance where the second suction-side surface meets the second pressure-side surface, the at least one protuberance being configured to improve the aerodynamic behavior of the thick aerodynamic envelope when the thick aerodynamic envelope impacts a stream of air either with the leading edge or with the trailing edge, the at least one protuberance being defined by a second length L' equal to a distance between a third end zone and a fourth end zone of the at least one protuberance along the longitudinal direction, the second length L' lying in a range 0.5 to 1 times the first length L of the thick aerodynamic envelope, the at least one protuberance being formed by a succession of second profiles situated in planes parallel to the transverse plane, each second profile being defined by:
   a height h' equal to a distance between the second suction-side surface and the second pressure-side surface, the height h' lying in a range 0.2 to 0.6 times the thickness h of the thick aerodynamic envelope;
   a width $\ell'$ equal to a distance between the succession of first profiles and the transverse end along the transverse direction, the width $\ell'$ being equal to 0.5 to 2 times the height h;
   non-zero connection radii between the succession of first profiles and the succession of second profiles; and
   a radius of curvature of the transverse end of the at least one protuberance between the second suction-side surface and the second pressure-side surface that is greater than a minimum radius $R_{mini}$.

2. The thick aerodynamic envelope according to claim 1, wherein the thick aerodynamic envelope and the at least one protuberance form a single part such that the first suction- and pressure-side surfaces and the second suction- and pressure-side surfaces form a single envelope.

3. The thick aerodynamic envelope according to claim 1, wherein the at least one protuberance is an element added on the thick aerodynamic envelope.

4. The thick aerodynamic envelope according to claim 1, wherein the second suction-side surface and the second pressure-side surface include a respective point of inflection.

5. The thick aerodynamic envelope according to claim 1, wherein the non-zero connection radii between firstly the first suction-side surface and the second suction-side surface, and secondly between the first pressure-side surface and the second pressure-side surface are greater than or equal to 25% of the height h' of the at least one protuberance, and are configured in such a manner that a tangentially continuous connection exists between firstly the first suction-side surface and the second suction-side surface and secondly between the first pressure-side surface and the second pressure-side surface.

6. The thick aerodynamic envelope according to claim 1, wherein the minimum radius $R_{mini}$ is greater than or equal to 15% of the height h' of the at least one protuberance.

7. The thick aerodynamic envelope according to claim 1, wherein, in each plane parallel to the transverse plane, each second profile of the at least one protuberance is arranged perpendicularly to a straight line connecting together the two points of intersection between one first profile of the succession of first profiles of the thick aerodynamic envelope and one second profile of the succession of second profiles of the at least one protuberance.

8. The thick aerodynamic envelope according to claim 1, wherein, in each plane parallel to the transverse plane, each second profile of the at least one protuberance is arranged so as not to be perpendicular to a straight line connecting together the two points of intersection between one first profile of the succession of first profiles of the thick aerodynamic envelope and one second profile of the succession of second profiles of the at least one protuberance.

9. The thick aerodynamic envelope according to claim 1, wherein in each plane parallel to the transverse plane, one second profile of the succession of second profiles of the at least one protuberance has an axis of symmetry.

10. The thick aerodynamic envelope according to claim 1, wherein a chord $\ell$ of the thick aerodynamic envelope is equal to a maximum distance between the leading edge and the trailing edge, and a relative thickness of the thick aerodynamic envelope equal to a ratio of the thickness h divided by the chord $\ell$ lies in a range 40% to 100%.

11. The thick aerodynamic envelope according to claim 1, wherein the width $\ell'$ varies in application of a spanwise variation relationship along the longitudinal direction.

12. The thick aerodynamic envelope according to claim 1, wherein the height h' varies in application of a spanwise variation relationship along the longitudinal direction.

13. The thick aerodynamic envelope according to claim 1, wherein the at least one protuberance comprises one protuberance arranged on the trailing edge of the thick aerodynamic envelope.

14. A rotor of an aircraft, the rotor having a hub, at least two blades, and thick aerodynamic envelopes, each thick aerodynamic envelope connecting a respective blade to the hub, wherein each thick aerodynamic envelope is in accordance with claim 1, and the at least one protuberance being configured in such a manner as to reduce the production of a wake of the at least one rotor and to limit an amplitude of unsteadinesses contained in the wake, and also to reduce a frequency signature of the wake.

15. A rotary wing aircraft having a fuselage, a tail boom, at least one vertical stabilizer, and at least one rotor, wherein the at least one rotor is in accordance with claim 14, the at least one protuberance being configured such that firstly it reduces the production of the wake of the at least one rotor and the unsteadinesses of the wake, and secondly it limits the appearance of vibrations in the tail boom and/or in the vertical stabilizer as generated by the wake.

16. An aerodynamic envelope for connecting to a rotary hub of an aircraft, the aerodynamic envelope extending spanwise in a longitudinal direction from a first end zone to a second end zone, and in a transverse direction between two transverse edges, the two transverse edges being a leading edge and a trailing edge, the aerodynamic envelope having a first suction-side surface and a first pressure-side surface, the aerodynamic envelope being defined by a first length L equal to a distance between the first end zone and the second end zone along the longitudinal direction;

the aerodynamic envelope being defined by a succession of first profiles situated in planes parallel to a transverse plane perpendicular to the longitudinal direction, each first profile being defined in a plane parallel to the transverse plane by a thickness h equal to a maximum distance between the first suction-side surface and the first pressure-side surface;

wherein the aerodynamic envelope includes a protuberance disposed on one of the transverse edges, the protuberance secured to the aerodynamic envelope, the protuberance having a second suction-side surface and a second pressure-side surface, the protuberance extending transversely from the transverse edge on which the protuberance is arranged to a transverse end of the protuberance where the second suction-side surface meets the second pressure-side surface, the protuberance defined by a second length L' equal to a distance between a third end zone and a fourth end zone of the protuberance along the longitudinal direction, the second length L' lying in a range 0.5 to 1 times the first length L of the aerodynamic envelope, the protuberance being defined by a succession of second profiles situated in planes parallel to the transverse plane, each second profile being defined by:

a height h' equal to a distance between the second suction-side surface and the second pressure-side surface, the height h' lying in a range 0.2 to 0.6 times the thickness h of the aerodynamic envelope;

a width $\ell'$ equal to a distance between the succession of first profiles and the transverse end along the transverse direction, the width $\ell'$ being equal to 0.5 to 2 times the height h;

non-zero connection radii between the succession of first profiles and the succession of second profiles; and a radius of curvature of the transverse end of the protuberance between the second suction-side surface and the second pressure-side surface that is greater than a minimum radius $R_{mini}$.

17. The aerodynamic envelope according to claim 16, wherein the non-zero connection radii between the first suction-side surface and the second suction-side surface, and between the first pressure-side surface and the second pressure-side surface are greater than or equal to 25% of the height h' of the protuberance, and are configured in such a manner that a tangentially continuous connection exists between firstly the first suction-side surface and the second suction-side surface and secondly between the first pressure-side surface and the second pressure-side surface.

18. The aerodynamic envelope according to claim 16, wherein the minimum radius $R_{mini}$ is greater than or equal to 15% of the height h' of the protuberance.

19. A rotary wing aircraft comprising:
a fuselage;
a tail boom,
a vertical stabilizer, and
a rotor having a hub, two blades, and two aerodynamic envelopes, each aerodynamic envelope connecting a respective blade to the hub, wherein each aerodynamic envelope extends spanwise in a longitudinal direction from a first end zone to a second end zone, and in a transverse direction between two transverse edges, the two transverse edges being a leading edge and a trailing edge, the aerodynamic envelope having a first suction-side surface and a first pressure-side surface, the aerodynamic envelope being defined by a first length L equal to a distance between the first end zone and the second end zone along the longitudinal direction;

the aerodynamic envelope being defined by a succession of first profiles situated in planes parallel to a transverse plane perpendicular to the longitudinal direction, each first profile being defined in a plane parallel to the transverse plane by a thickness h equal to a maximum distance between the first suction-side surface and the first pressure-side surface;

wherein the aerodynamic envelope includes a protuberance disposed on one of the transverse edges, the protuberance secured to the aerodynamic envelope, the protuberance having a second suction-side surface and a second pressure-side surface, the protuberance extending transversely from the transverse edge on which the protuberance is arranged to a transverse end of the protuberance where the second suction-side surface meets the second pressure-side surface, the protuberance defined by a second length L' equal to a distance between a third end zone and a fourth end zone of the protuberance along the longitudinal direction, the second length L' lying in a range 0.5 to 1 times the first length L of the aerodynamic envelope, the protuberance being defined by a succession of second profiles situated in planes parallel to the transverse plane, each second profile being defined by:

a height h' equal to a distance between the second suction-side surface and the second pressure-side surface, the height h' lying in a range 0.2 to 0.6 times the thickness h of the aerodynamic envelope;

a width $\ell'$ equal to a distance between the succession of first profiles and the transverse end along the transverse direction, the width $\ell'$ being equal to 0.5 to 2 times the height h';

non-zero connection radii between the succession of first profiles and the succession of second profiles; and a radius of curvature of the transverse end of the protuberance between the second suction-side surface and the second pressure-side surface that is greater than a minimum radius $R_{mini}$.

20. The rotary wing aircraft of claim 19, wherein the non-zero connection radii between the first suction-side surface and the second suction-side surface, and between the first pressure-side surface and the second pressure-side surface are greater than or equal to 25% of the height h' of the protuberance, and wherein the minimum radius $R_{mini}$ is greater than or equal to 15% of the height h' of the protuberance.

* * * * *